May 16, 1967 P. R. BOHN 3,319,995
INSULATION MEANS FOR CONVERTIBLE AUTOMOBILES
Filed Nov. 26, 1965
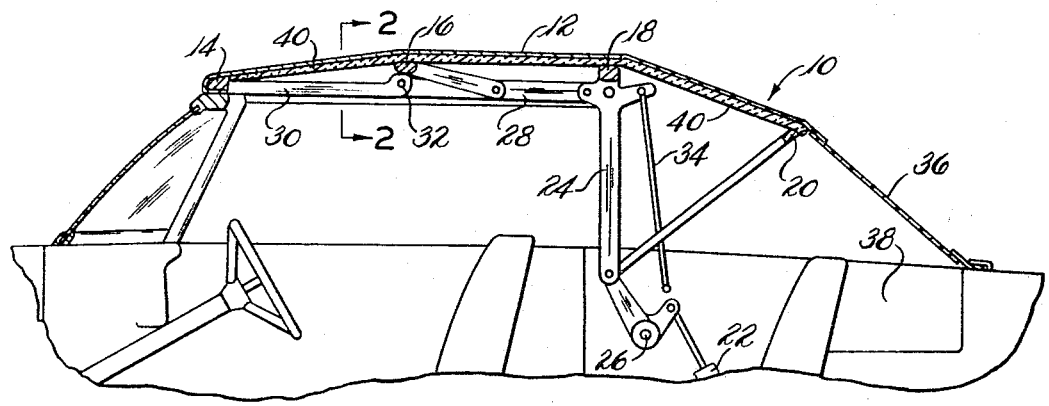
FIG. 1
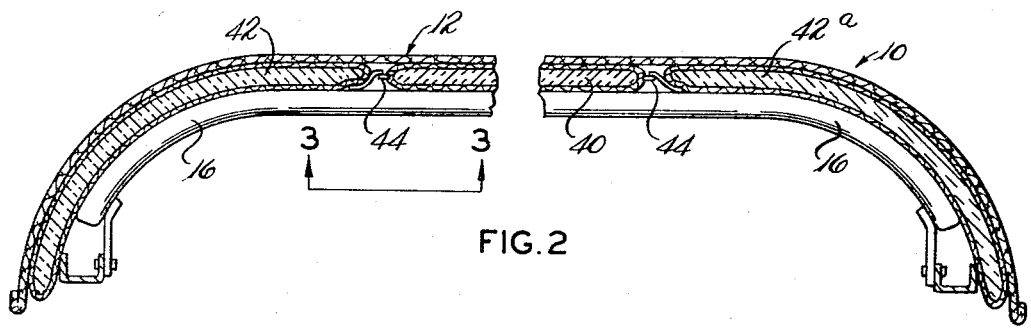
FIG. 2
FIG. 3
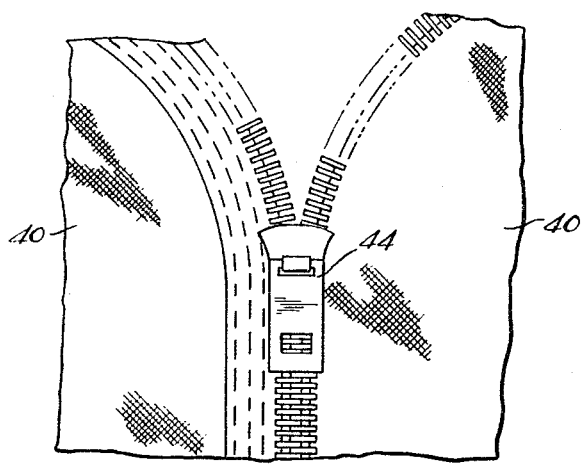
FIG. 4
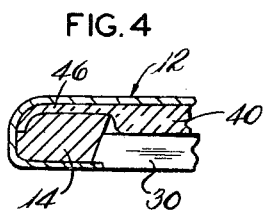
INVENTOR.
PAUL R. BOHN
BY Oldham & Oldham
ATTYS.

United States Patent Office 3,319,995
Patented May 16, 1967

3,319,995
INSULATION MEANS FOR CONVERTIBLE
AUTOMOBILES
Paul R. Bohn, 27 Morningside Drive,
Walpole, Mass. 02081
Filed Nov. 26, 1965, Ser. No. 509,946
5 Claims. (Cl. 296—107)

This invention relates to insulation strips positioned between the support bows of a convertible automobile top and extending underneath the entire width of the convertible car top and laterally connected together in a releasable manner. Such insulation strips are made of soft and flexible batting permitting the insulation strips to fold up with the convertible car top when the top is put in an up or down position.

Heretofore it has always been an inherent problem with convertible cars to keep them warm in the winter and cool in the summer. Generally, convertible cars are made with flexible fabric tops which do not sufficiently keep heat from escaping through the thin top. This causes the inside of the convertible car to become extremely cold after the car has been outside in winter for a prolonged period. Problems also arise in the summertime when the hot rays of the sun penetrate the thin canvas car top causing the inside of the car to become quite hot. Convertible car tops usually have narrow pads carried thereby by the lateral margins thereof. These pads are usually about 8 inches wide and extend longitudinally the entire length of the top. The pads, however, mainly serve to keep the convertible top stretched taut against the frame means and to prevent sagging rather than to insulate the top.

It is the general object of the invention to provide insulation for convertible car tops which is inexpensive, durable, and easy to install and remove. The improved thermal insulation properties created by the insulation insure better heating in cold weather, and also reduce the effects of solar heating in summer.

Another object of the invention is to provide insulation strips which can be easily installed in a convertible car top between the transverse support rods of the frame and the canvas car top. The insulation strips can be readily attached to the lateral edges of the conventional pads hereinbefore described by releasable fasteners secured to the lateral edges of the insulation strips whereby an insulation assembly is formed to cover the entire width and length of the convertible car top.

Another object of the invention is to provide insulation strips which can be installed in a convertible not having the conventional pads whereby two or three of the strips are installed in a convertible top to cover the entire width and length of the car top.

Another object of the invention is to facilitate the placement of the insulation in the manner described by utilizing a plurality of strips which are more easily handled and installed and followed by laterally connecting the edges of the strips together to provide the complete insulation blanket.

Another object of the invention is to provide insulation means for attachment to new or used convertible tops which will be easy to install and will be neat in appearance when viewed by a passenger inside the convertible car.

These and other objects of the invention which will become more apparent as the description proceeds, are achieved by providing in an automobile the combination of a collapsible, convertible car top; frame means supporting said top, including a plurality of support rods transversely extending under said top and forming the shape thereof; means for alternately collapsing or erecting said frame means and said top supported thereby; a plurality of elongate insulation battings extending longitudinally under said top, said insulation battings extending over and being carried by said transverse support rods; and means for releasably engaging with each other the laterally extending edges of said insulation battings wherein said battings extend transversely across the entire width of said convertible car top.

For a better understanding of the apparatus of the invention, reference should be had to the following drawings wherein:

FIG. 1 illustrates a standard, conventional convertible car, partially broken away in longitudinal, vertical section, utilizing the insulation strips of the invention;

FIG. 2 is an enlarged cross sectional view, partially broken away, and taken substantially along lines 2—2 of FIG. 1;

FIG. 3 is an enlarged plan view of the attachment means of the apparatus of the invention taken in the direction of lines 3—3 of FIG. 2;

FIG. 4 is a longitudinal cross sectional view, partially broken away, showing in greater detail than FIG. 1 a manner in which the ends of the insulation strips could be secured to the frame.

In the drawings, and particularly FIG. 1, the numeral 10 generally indicates an automobile partially broken away with a typical convertible top. The actual top 12 is made of a canvas or plastic covered fabric material which is durable, weather resistant, and flexible. The actual framing means may take a variety of known forms. In the embodiment shown, the convertible top 12 is bent over and secured to a header 14 which is mounted at the front end of the frame means of the convertible top. A front bow 16 and a main bow 18 form the main transverse bow supports for the convertible top, but there also is a floating rear bow 20, also a transverse bow support. These transverse bow supports form the main support for the canvas convertible top 12, with the balance of the illustrated frame means serving in known manner to effect the raising or lowering of the top.

Hydraulic piston means 22, partially broken away, and usually on both sides, act as the power source to raise and lower the top. Linkage arm means 24 is the main articulating linkage arm revolving around the pivotal point 26 when the hydraulic piston means 22 is actuated. Linkage arm means 28 and 30, pivotally connected at point 32, and control link means 34 form the balance of the basic frame for the illustrated convertible top. Most convertible tops also have some type of transparent plastic rear window 36, and a box well 38 into which the entire convertible top and frame means fold when lowered.

A plurality of elongate insulation strips 40, best illustrated in FIGS. 1 and 2, are temporarily or permanently secured under the convertible top 12 by sliding the insulation strips 40 between the top 12 and the transverse support rods 16, 18 and 20. The insulation strips 40 can be made of any suitable material but are best adapted for use in the apparatus of the invention when constructed from fiberglass, rock wool, or other batting attached to or covered by suitable cloth, plastic or metal foil backing. It should be noted that although the insulation strips 40 are best adapted to be installed when the top is in a partially collapsed position, it is possible to raise or move the canvas top 12 off of or away from the transverse support rods and slide the insulation strips 40 therebetween when the convertible top is in the up position indicated in FIG. 1.

Although the insulation strips 40 can be made into any width desired, it has been found that the best results are achieved when two or preferably three of the insulating strips 40 can be used to cover the entire width and length of the convertible top between conventional side pads 42 and 42a of the top. In the actual installation of the insulation strips 40, the first strip to be installed is pushed between the transverse support bars 16, 18 and 20, and the top 12. One of the laterally extending edges of the first insulation strip 40 is then releasably engaged with the laterally extending edge of the side pad 42, this being best illustrated in FIG. 2.

A second insulation strip 40 is then also pushed between transverse support bars 16, 18 and 20 and the top 12 with one of the lateral edges thereof being releasably engaged with the adjacent laterally extending edge of the previously installed insulation strip 40 by means of a zipper or some other suitable fastening means 44, this being best indicated in FIG. 3. A third insulation strip 40, if necessary, is inserted between the top 12 and the transverse support rods and is releasably engaged with the laterally extending edge of the side pad 42a. The second and third insulation strips then are joined along their laterally extending edges by the releasable engagement means 44 and the insulation assembly formed thereby extends across the entire width and length of the convertible car top 40.

The fastening means 44, which join the laterally extending edges of the insulation strips 40, secures the strips together with a maximum of continuity and a minimum of air leak, increasing the effectiveness and efficiency of the insulating material. The fastening means also enable the inside of the convertible top to be covered by the insulating strips 40 with a neatness and compactness which is achieved with minimum effort and labor. It should be noted that the novel idea of installing the insulation strips 40 one at a time and then securing their laterally extending edges by the fastening means 44 facilitates the installation. It is relatively easy to handle and install the small insulation strips consecutively and independently whereas it would be difficult to install a large one piece insulation blanket. Obviously, however, only one insulation strip 40 may be used to extend across the top between the side pads 42 and 42a and be suitably secured thereto, if desired.

In the case of convertible cars not having the side pads 42 and 42a, it is possible to adapt the insulation strips 40 to push down between the top 12 and the extending side of the frame means of the car top. This permits the entire width and length of the car top to be insulated against the outside elements even though the side pads are not present.

When the fastening means 44 comprise slide fasteners, they normally include fabric edge support strips that can be adhesively attached or be sewn to marginal portions of the insulation strips or car top side pads. Conventional snap fasteners can be used when desired, or the insulation means may be sewn or cemented to any side pads present in the top.

It may be noted that the lateral edges of the insulation strips at the sides of the top are easily inserted and yet are frictionally held very well between the frame of the top. The front and back ends of each insulation strip are normally pushed between the top 12 and the frame header 14 and rear bow 20. Leaving a thin flap, flaps or tabs 46 on the end, or ends of the insulation batt or means allows such a flap or tabs 46 to be pressed (rather than the entire thickness of the insulation) into holding position as shown in FIG. 4.

If the car top is secured to the crossbows 16 and 18, then the insulation means can just bridge down under such crossbows. Any desired support straps, pads, or brackets may be used to aid in securing such insulation strip, strips, or means to the crossbows and/or any side pads, or lateral edge portions of the convertible top.

Insulation kits of insulation strips and means to attach them to the side pads of a convertible can readily be prepared for attachment to existing structures.

While a certain representative embodiment and details have been shown for the purpose of illustrating the invention, it will be apparent to those skilled in this art that various changes and modifications may be made therein without departing from the spirit or scope of the invention.

What is claimed is:

1. In an automobile, including a collapsible, convertible car top, frame means supporting said top and including a plurality of support rods transversely extending under said top and forming the shape thereof, means for alternately collapsing or erecting said frame means and said top supported thereby, and a pair of elongate side pads extending longitudinally under said top between it and said support rods at the lateral margins of said top, the combination of
 an insulation batting means extending over and being carried by said transverse support rods intermediate said side pads, and
 means carried by said batting means at marginal portions thereof for releasably engaging with the laterally extending edges of said side pads whereby said battings and side pads form a unit that extends transversely across the entire width of said convertible car top.

2. In an automobile, as in claim 1, said batting means comprising
 a plurality of elongate insulation battings extending longitudinally under said top and being carried by said transverse support rods, and
 means for releasably engaging the lateral longitudinally extending edges of said battings to secure them together.

3. In an automobile as in claim 1, said batting means bridging under said support rods.

4. In an automobile as in claim 1 where said means for securing said insulation means to said side pads comprise zipper means for releasably engaging with each other the laterally extending edges of said batting means and side pads to form a unit that extends across the entire width and length of said car top.

5. In an automobile, as in claim 1, said insulation batting means including
 flap on said insulation batting means at the front end thereof, said insulation batting means being at least partially held in position by said flap being wedged between a front support rod of the frame means and the top.

References Cited by the Examiner

UNITED STATES PATENTS

| | | | |
|---|---|---|---|
| 1,298,836 | 4/1919 | Vetter | 296—107 X |
| 1,299,637 | 4/1919 | Vetter | 296—107 X |
| 2,833,593 | 5/1958 | Olivier et al. | 296—107 |
| 3,050,334 | 8/1962 | Geiger | 296—107 |

BENJAMIN HERSH, *Primary Examiner.*

C. C. PARSONS, *Assistant Examiner.*